US010289604B2

(12) United States Patent
Sankaralingam et al.

(10) Patent No.: US 10,289,604 B2
(45) Date of Patent: May 14, 2019

(54) MEMORY PROCESSING CORE ARCHITECTURE (71) Applicant: Wisconsin Alumni Research Foundation, Madison, WI (US)

(72) Inventors: Karthikeyan Sankaralingam, Madison, WI (US); Jaikrishnan Menon, Madison, WI (US); Lorenzo De Carli, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 136 days.

(21) Appl. No.: 14/453,990

(22) Filed: Aug. 7, 2014

(65) Prior Publication Data

US 2016/0041856 A1  Feb. 11, 2016

(51) Int. Cl.
*G06F 9/30* (2018.01)
*G06F 12/00* (2006.01)
*G06F 15/78* (2006.01)

(52) U.S. Cl.
CPC ......... *G06F 15/7821* (2013.01); *Y02D 10/12* (2018.01); *Y02D 10/13* (2018.01)

(58) Field of Classification Search
CPC ............ G06F 15/7821; Y02B 60/1207; Y02B 60/1225
See application file for complete search history.

(56) References Cited

U.S. PATENT DOCUMENTS 5,974,543 A * 10/1999 Hilgendorf ........... G06F 9/3806
712/240
6,349,322 B1 * 2/2002 Shaylor ..................... G06F 9/52
718/107

2006/0005072 A1 * 1/2006 Philippe Conti ....... G06F 21/82
714/5.11
2010/0005217 A1 * 1/2010 Jeddeloh .................. G11C 5/02
711/1

(Continued)

OTHER PUBLICATIONS

Leidel, etc., "HMC-Slim: A Simulation Framework for Hybrid Memory Cube Devices", IEEE, Dec. 4, 2014, pp. 1-4.*

(Continued)

*Primary Examiner* — S. Sough
*Assistant Examiner* — Phuong N Hoang
(74) *Attorney, Agent, or Firm* — Boyle Fredrickson, S.C.

(57) ABSTRACT

Aspects of the present invention provide a memory system comprising a plurality of stacked memory layers, each memory layer divided into memory sections, wherein each memory section connects to a neighboring memory section in an adjacent memory layer, and a logic layer stacked among the plurality of memory layers, the logic layer divided into logic sections, each logic section including a memory processing core, wherein each logic section connects to a neighboring memory section in an adjacent memory layer to form a memory vault of connected logic and memory sections, and wherein each logic section is configured to communicate directly or indirectly with a host processor. Accordingly, each memory processing core may be configured to respond to a procedure call from the host processor by processing data stored in its respective memory vault and providing a result to the host processor. As a result, increased performance may be provided.

24 Claims, 5 Drawing Sheets (56) References Cited

U.S. PATENT DOCUMENTS

| | | | | |
|---|---|---|---|---|
| 2011/0119508 A1* | 5/2011 | Heller, Jr. | ............ | G06F 15/7896 |
| | | | | 713/320 |
| 2012/0151159 A1* | 6/2012 | Muralimanohar | ..... | A01N 65/00 |
| | | | | 711/154 |
| 2013/0336082 A1* | 12/2013 | Khawshe | ............... | G11C 5/005 |
| | | | | 365/233.12 |
| 2014/0040532 A1 | 2/2014 | Watanabe et al. | | |
| 2014/0181361 A1* | 6/2014 | Kegel | ................. | G06F 12/0804 |
| | | | | 711/102 |
| 2014/0281311 A1* | 9/2014 | Walker | .................. | G06F 3/0631 |
| | | | | 711/162 |
| 2015/0357010 A1* | 12/2015 | Jeddeloh | ............... | G06F 1/3225 |
| | | | | 710/317 |

OTHER PUBLICATIONS

HMC, "Inside the Hybrid Memory Cube", Sep. 2013, pp. 1-6.*
Hybrid Memory Cube Specification 1.0; 2013 Altera Corporation, ARM Ltd., Hewlett-Packard Company, International Business Machines Corporation. Micron Technology, Inc; pp. 1-122; US.
J. Thomas Pawlowski; Hybrid Memory Cube (HMC); 2011 Micron Technology, Inc.; pp. 1-24; US.
Venray Technology Ltd; Implementations; website—http://www.venraytechnology.com/Implementations.htm; 2005-2014 Venray Technology Ltd.; pp. 1-2; US.
JEDEC Standard; High Bandwidth Memory (HBM) DRAM; JEDEC Solid State Technology Association; Oct. 2013; Published by © JEDEC Solid State Technology Association 2013; pp. 1-124; Arlington, VA.
Joe Jeddeloh et al,; Hybrid Memory Cube New DRAM Architecture Increases Density and Performance; VLSI Technology (VLSIT), Jun. 12-14, 2012 Symposium; pp. 87-88; Honolulu, HI.

* cited by examiner

MEMORY PROCESSING CORE ARCHITECTURE

STATEMENT REGARDING FEDERALLY SPONSORED RESEARCH

This invention was made with government support under 1228782 awarded by the National Science Foundation. The government has certain rights in the invention.

BACKGROUND OF THE INVENTION

The present invention relates to computer technologies, and more particularly, to memory systems for computers.

Modern computer architectures typically provide one or more multi-core processors connected to a tiered memory structure that includes various levels of caches and a main memory. As a processor executes application code that is part of an instruction stream, the processor must continually retrieve instructions and data from the tiered memory structure for processing. If a faster, proximally closer memory, such as a Level 1 cache, does not contain the necessary instructions or data required by the processor, the processor must typically wait for a slower, more distant memory, such as a Level 2 or 3 cache or a main memory, to provide the information.

Such architectures are inefficient to the extent that significant time and energy are consumed to move information between the processor cores and the tiered memory structure. For example, if a closer memory does not contain the necessary instructions or data required by the processor, depending on the distance between the processor and the memory containing the required information, the computer system could suffer from significantly greater access latencies and power consumed simply by transferring bits between circuits than would otherwise be necessary.

One approach toward mitigating access latency is to provide a three-dimensional (3D) memory with a helper processor as described in U.S. patent application Ser. No. 13/567,958, titled "Stacked Memory Device with Helper Processor." In this approach, layers of memory are stacked and connected through the use of "through-silicon vias" (TSV's) and a helper processor is provided to perform certain memory-intensive operations. Although this approach provides some improvement with respect to speed and bandwidth, it continues to rely on a conventional approach of linearly organizing instructions and data.

A need therefore exists to provide an improved architecture capable of meeting increasing performance demands while improving access latencies with minimized power consumptions.

SUMMARY OF THE INVENTION

The present inventors have recognized that by tightly coupling memory processing unit cores with sections of stacked memory layers, combined as memory "vaults" in hardware, and by segmenting application code into discrete partitions (or "shards") in software for storage in such memory vaults, a host processor can efficiently offload entire pieces of computation to obtain higher system performance with increased power efficiency. Accordingly, implementing memory processing cores in close proximity to memory layers, which cores are balanced by the bandwidth and the natural bank organization of the memory layers, and partitioning application code to utilize such memory processing cores, significantly improves the benefit of 3D die-stacking.

On the programming model and the execution side, memory remote procedure calls may be used to offload pieces of computation to memory processing cores contained in memory vaults. A memory remote procedure call is a call made by a host processor to a memory processing core in a memory vault such that the host processor offloads computation of a partition of application code to the memory processing core in the memory vault containing instructions and/or data for the partition. On the hardware side, cache-less, non-speculative, low-frequency, ultra-short pipeline memory processing cores are integrated closely with memory to provide faster processing with less power consumption. As a result, an application program is effectively broken up for execution among a plurality of processing cores in close proximity to memory to achieve faster processing with reduced power consumption.

In operation, a host processor loads data, performs initialization, initiates computation via remote procedure calls and retrieves results. Memory processing cores execute the memory-intensive part of the workload, and calls may be triggered using a host processor executed Application Program Interface (API) that sends commands to a memory processing controller. The memory processing controller may examine the target address of each request and route the request to the correct memory vault. The memory vault may, in turn, retrieve partitioned instructions and/or data stored in the memory vault and process the information via the memory processing cores embedded in the memory vault.

With memory vaults including multiple memory processing cores, each memory vault can allow multiple computations to proceed in parallel. In addition, computations in different memory vaults can proceed concurrently, thereby optimizing performance.

Also, using a queue-based mechanism allows a single host processor thread to issue a large number of memory processing unit commands to memory processing cores without competing for a shared resource, i.e., without blocking. This enables massively parallel workloads in the memory system with the memory processing cores with fewer host threads managing them, and with consequent power/energy savings.

In accordance with an embodiment, a memory system may comprise: a plurality of stacked memory layers, each memory layer divided into memory sections, wherein memory sections are vertically connected to other memory sections in the stacked memory layers to form a plurality of memory columns and a logic layer divided into logic sections, each logic section including at least one memory processing core, wherein each logic section connects to a memory column to form a memory vault of a connected logic and memory sections, and wherein each logic section is configured to communicate directly or indirectly with a host processor. Each memory processing core may be configured to respond to a procedure call from the host processor wherein a memory processing core processes a partition of instructions or data stored in its respective memory vault for the host processor and provides a result back to the host processor.

The host processor may execute an application code divided into a plurality of partitions, and each partition is allocated for storage in a memory vault.

It is thus a feature of at least one embodiment to segment application code into discrete partitions for storage in memory sections for offloading entire pieces of computation from the host processor to combined processing core and memory sections.

Each logic section may include a particular number of memory processing cores according to the number of memory layers. For Example, one embodiment may provide at least one memory processing core per memory layer, and another embodiment may provide at least one memory processing core per two memory layers.

It is thus a feature of at least one embodiment to provide a distribution of processing cores with respect to memory layers to provide optimal processing capability localized to a memory section targeted for a partition of application code at runtime.

Each memory section may comprise a plurality of DRAM memory banks, and each logic section may include at least one memory processing core per DRAM memory bank.

It is thus a feature of at least one embodiment to provide maximal efficiency for transferring bits with reduced power consumption while providing localized processing capability.

Also disclosed are a computer system and a method for executing application code implementing one or more of the above features.

These particular objects and advantages may apply to only some embodiments falling within the claims, and thus do not define the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
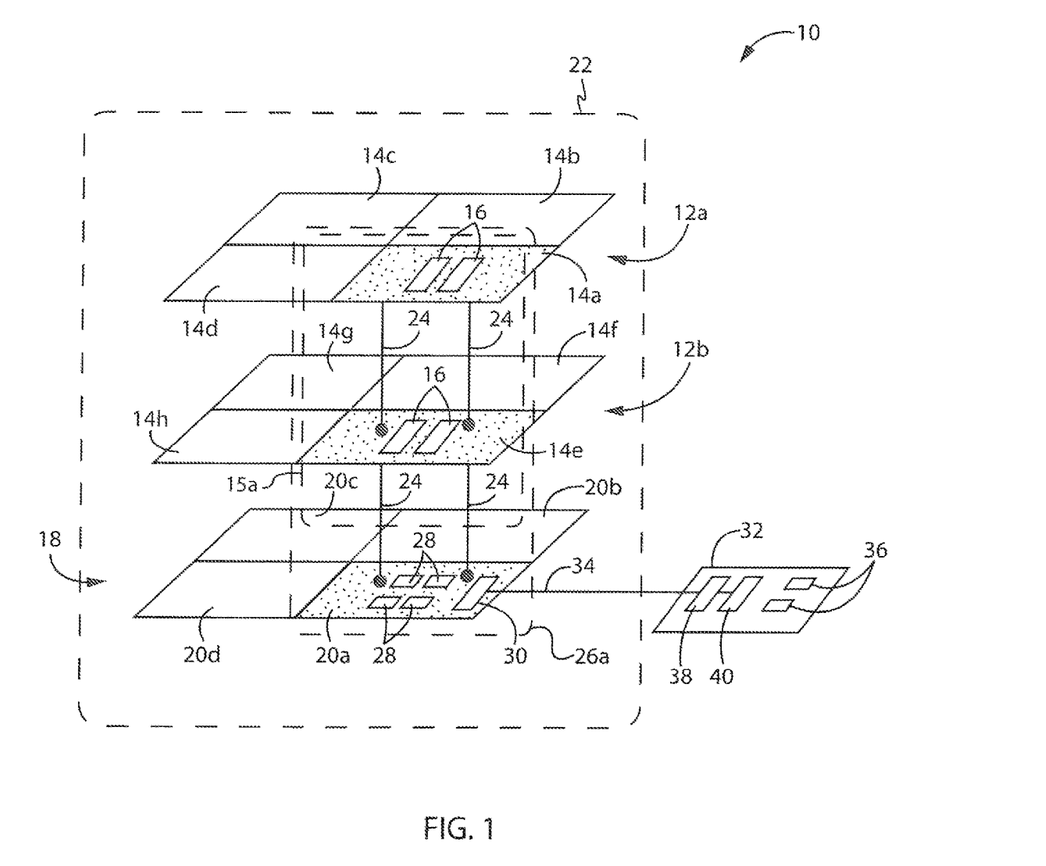
FIG. 1 is a simplified block diagram of a computer system in accordance with an embodiment of the invention.

Referring now to FIG. 1, an embodiment of the present invention will be described in the context of a computer system 10. The computer system 10 could be implemented in a variety of applications, including, for example, a laptop, tablet, smart phone or other mobile computing device, a desktop computer, a server, a network router, switch or hub, and the like.

In the computer system 10, a plurality of memory layers 12 are "stacked," or arranged in a three-dimensional (3D) configuration in which layers are physically arranged one over the other, such as by wafer-on-wafer or die-on-wafer processes, with the memory layers 12 physically being coupled together. Each memory layer 12 comprises a separate die or "chip" in which one is fabricated over the other, or stacked adjacently, using conventional monolithic 3D fabrication techniques. In this example, for simplicity, two adjacent memory layers are shown, including an upper memory layer 12a and a lower memory layer 12b.

The memory layers 12 may implement any of a variety of memory cell architectures, including, but not limited to, volatile memory architectures such as Dynamic Random Access Memory (DRAM) and Static Random Access Memory (SRAM), or non-volatile memory architectures, such as Read-Only Memory (ROM), flash memory, and the like. The example implementations of the memory layers 12 are described herein in the example, non-limiting context of a DRAM architecture.

The memory layers 12 are each divided into a plurality of memory sections 14. Division into the memory sections 14 may be made according to the type of memory implemented and the optimal organization of that memory for high speed data storage and retrieval with the least amount of transferring of bits between circuits. In this example, for simplicity, the memory layers 12 each implement four memory sections 14, which may comprise DRAM, and each memory section 14 may include two memory banks 16 (which may comprise DRAM banks). A memory bank is a logical unit of storage which may be determined by a memory controller along with the physical organization of the memory circuitry. Memory sections 14 are vertically connected to other memory sections 14 in the stacked memory layers 12 to form a plurality of memory columns 15, such as memory column 15a formed by memory sections 14a and 14e.

The computer system 10 also includes a logic layer 18, which in an embodiment may be stacked among the plurality of memory layers 12. In this example, for simplicity, one logic layers is shown stacked among the memory layers 12. Alternatively, referring briefly to FIG. 2, instead of being stacked among the memory layers, the logic layer 18 may be connected to the memory layers 12 via an interposer 19, such as another silicon component or a Printed Circuit Board (PCB).

Referring again to FIG. 1, the logic layer 18 is similarly divided into logic sections 20. Division into the logic sections 20 may be made according to the divisions made of the memory layers 12 into the memory sections 14. For example, the logic layer 18 may be divided into a number of logic sections 20 equal to the number of memory sections 14 in a given memory layer 12, which is thereby sufficient to support the memory sections 14 of a memory column 15. Computation elements in the logic layer 18 should be balanced with bandwidth and the natural bank organization of the memory layers 12 to exploit the benefits of memory die-stacking.

In an embodiment, a vertically stacked memory system 22, comprising the memory layers 12 and the logic layer 18, are connected together such that electrical power and signaling (data and command) may be transmitted between the memory layers 12 and the logic layer 18 using a vertical interconnect, such as an array of "through-silicon vias" (TSV's) 24. The TSV's 24 may be dispersed throughout the memory layers 12 and the logic layer 18 in the memory system 22 such that each section of each layer is adjacently connected together with wide data paths. For example, as shown in the example of FIG. 1, each memory section vertically connects to memory sections in adjacent memory layers, such as memory section 14a connecting to memory section 14e, and each logic section connects to a memory column of memory sections, such as logic section 20a connecting to memory column 15a, using TSV's 24. As a result, the TSVs 24 connect from the memory layers 12 to the logic layer 18 to form a plurality of memory vaults or cross-sections of the vertically stacked memory system 22.

Figure 2:
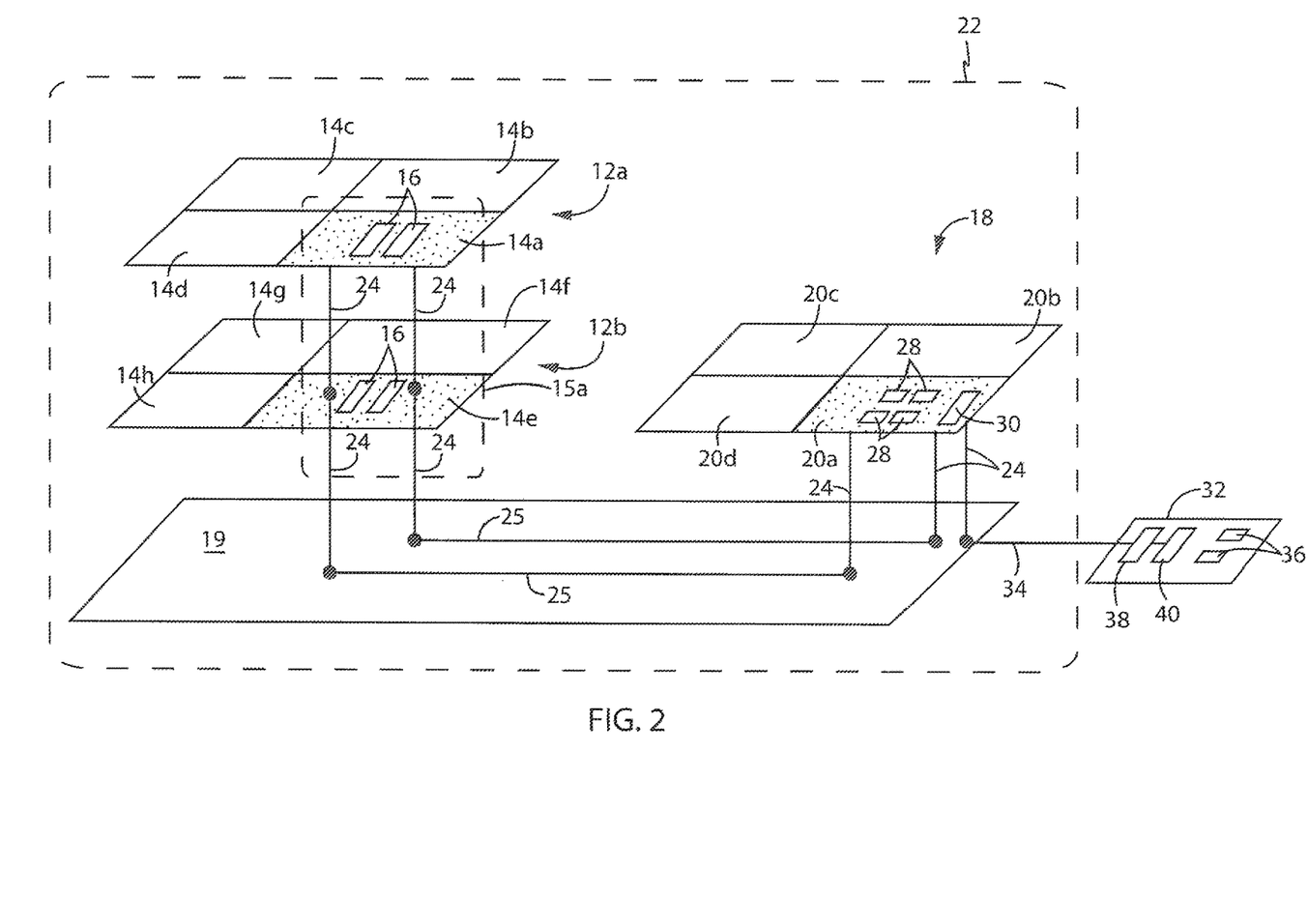
FIG. 2 is a simplified block diagram of a computer system using an interposer in accordance with an embodiment of the invention.

In other words, the TSVs 24 run from the logic layer 18 to the top-most memory layer 12, with "taps" into the logic layer 18 and each memory layer 12. Referring briefly to FIG. 2, alternatively, the TSVs 24 could run from the top-most memory layer 12a to the bottom-most memory layer 12b, then to the interposer 19, with connections 25 to another set of the TSVs 24 connecting to the logic layer 18 side-by-side, with "taps" into each memory layer 12 and the logic layer 18.

Referring back to FIG. 1, accordingly, a single memory vault 26, such as memory vault 26a, could include 32 data signals TSV's 24 clocked at 2 GHz, in addition to command signals and power TSV's 24. Consequently, each memory vault 26 provides extremely high bandwidth between the memory sections 14 and the logic sections 20 with low latency and low energy consumption due to their close proximities.

Accordingly, a plurality of memory "vaults" comprising connected memory sections of a memory column and a logic section are formed, such as memory vault 26a comprising memory sections 14a and 14e of memory column 15a and logic section 20a, connected by TSV's 24. A single package containing multiple memory die and one logic die stacked together using TSV technology, and resulting memory "vaults," are described in the Hybrid Memory Cube Specification 1.0, 2013, provided by the Hybrid Memory Cube ("HMC") Consortium, which publication is hereby incorporated by reference in its entirety. In effect, the memory system 22 may be implemented as a single package with a capacity of 1, 2 or 4 GB or greater.

In embodiments of the invention, each logic section 20 includes at least one memory processing core 28, and in a preferred embodiment, a plurality of memory processing cores 28, each capable of executing instructions and processing data. The memory processing cores 28 may comprise, for example, cacheless, non-speculative, low-frequency, low-power, short pipeline processing units integrated closely with the memory to provide efficient processing. The memory processing cores 28 could be Cortex-M3 processors comprising three stage pipelines (fetch, decode and execute stages) as described by ARM Limited. In embodiments, the logic sections 20 may provide at least one memory processing core 28 per number of memory layers 12 or at least one memory processing core 28 per DRAM memory bank 16.

Each logic section 20, and/or memory vault 26, and/or memory system 22, also includes communication logic 30 (which may implement SERDES links for I/O) for communicating with one or more host processors 32 via interconnect 34. The host processor 32 may comprise multiple host processing cores 36, a memory system controller 38, such as a packet based HMC controller, and a memory processing controller 40.

By way of comparison, clock frequencies of the memory processing cores 28 may be substantially less than a clock frequency of the host processor 32 or the host processing cores 36 thereby optimizing power. For example, clock frequencies of the memory processing cores 28 might operate at about 250 MHz in an embodiment, as compared to greater than GHz operation of the host processor 32.

The host processor 32 may communicate remote procedure calls to the memory processing controller 40, and the memory processing controller 40 may route the procedure calls directly or indirectly to the memory processing cores 28 (such as through the memory system controller 38 and the communication logic 30). The memory processing controller 40 routes the procedure calls to the appropriate memory processing cores 28 based on target addresses of the procedure calls corresponding to memory vaults 26 of the respective memory processing cores 28. In turn, the memory processing cores 28 respond to the procedure calls by efficiently processing data stored in their respective memory vaults 26 and providing a result to the host processor 32.

In alternative embodiments, greater or fewer memory layers 12, and a plurality of logic layers 18 may be provided, and each may be divided into greater or fewer sections. Also, the ordering and/or arrangement of memory and logic layers may be modified without departing from the spirit of the present invention. In addition, the functionality of various components, such as the communication logic 30, the memory system controller 38 and the memory processing controller 40 could be implemented in various areas of the computer system 10 with various levels of integration.

Figure 3:
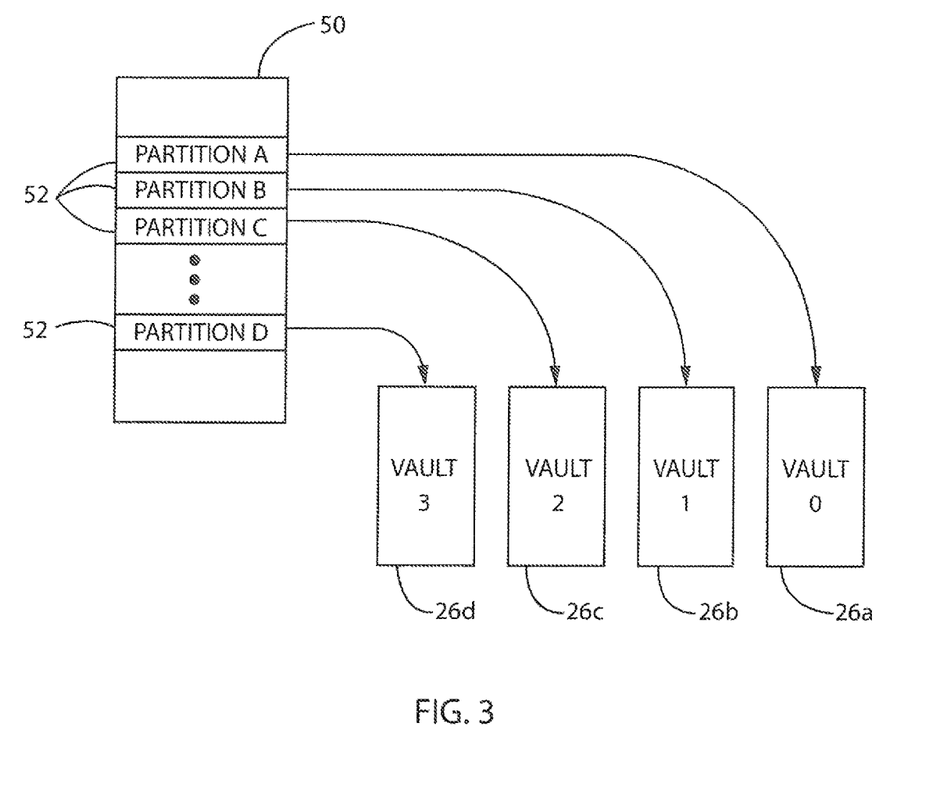
FIG. 3 is an exemplar depiction of application code divided into partitions (or "shards") allocated for storage in memory vaults in accordance with an embodiment of the invention.

Referring now to FIG. 3, an exemplar depiction of application code 50, which may be executing on the host processor 32, is divided into partitions 52 (or "shards") which are allocated for addressable storage in memory vaults 26 in accordance with an embodiment of the invention. The programming model establishes partitions 52 of the application code 50 such that each partition 52 is optimized for storage in a separate memory vault 26.

For example, "Partition A" may be allocated to memory vault 26a ("Vault 0"), "Partition B" may be allocated to memory vault 26b ("Vault 1"), and so forth. The partitions 52 need not be contiguous with respect to the application code 50, and multiple partitions 52 may be allocated to the same memory vault 26. In effect, the programming model establishes a separation of data across memory vaults.

Accordingly, a memory processing core 28, upon receiving a procedure call from the host processor 32 routed by the memory processing controller 40, may respond to the procedure call by processing the partitioned data stored in its respective memory vault 26 and providing a processed result back to the host processor 32. With memory vaults 26 advantageously including multiple memory processing cores 28, each memory vault 26 can allow multiple computations to proceed in parallel. In addition, computations in different memory vaults 26 can proceed concurrently.

Figure 4:
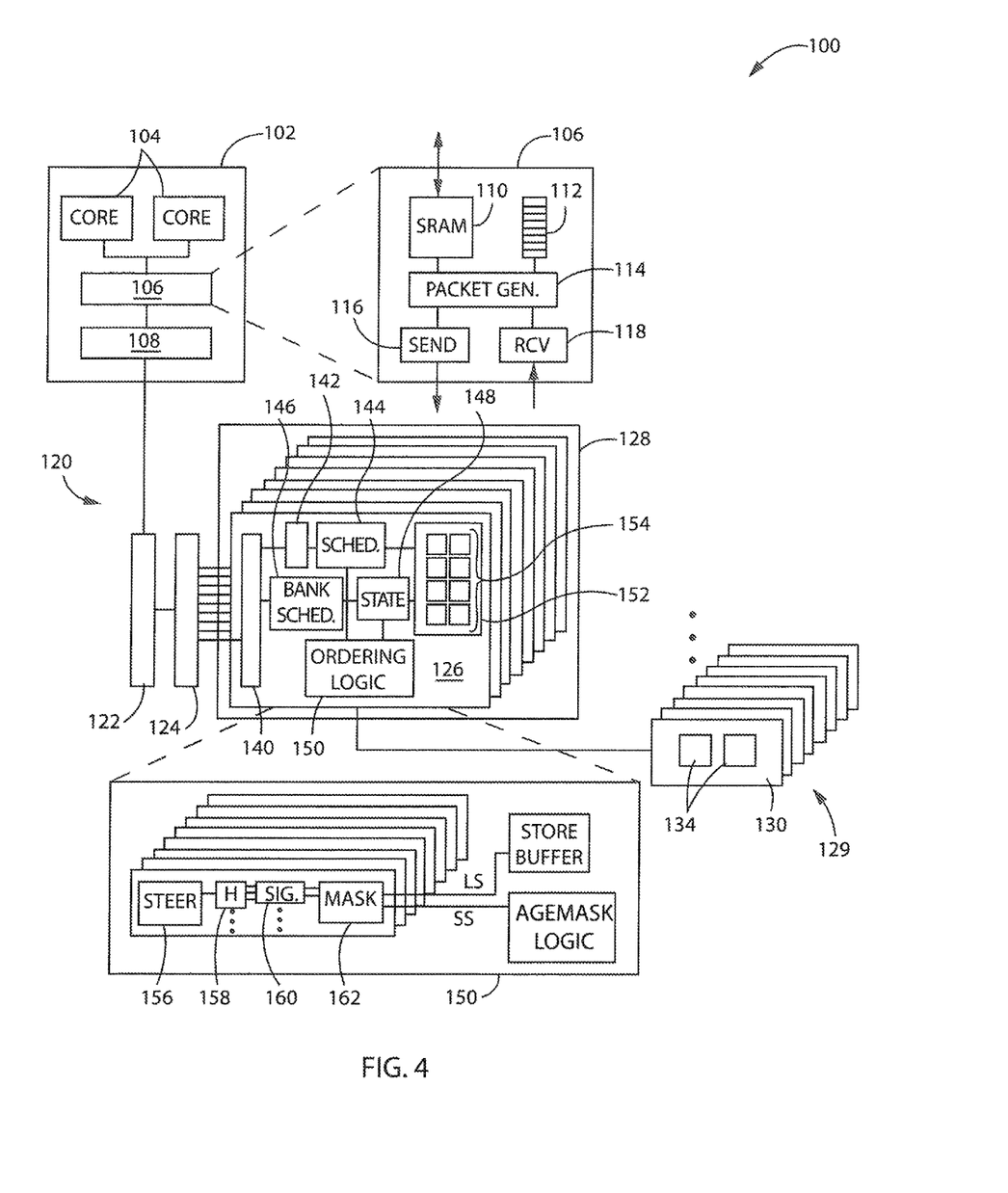
FIG. 4 is a more detailed block diagram of a computer system in accordance with an embodiment of the invention.

Referring now to FIG. 4, a more detailed block diagram of a computer system 100 is provided in accordance with an embodiment of the invention. The computer system 100 includes one or more host processors 102 and a memory system 120. Referring first to the host processor 102, one or more host processing cores 104 of the host processor 102 operate to execute application code according to one or more threads. The host processing cores 104, in turn, communicate with a memory processing controller 106 which, in turn, communicates with a memory system controller 108. The memory processing controller 106 interfaces the host processing cores 104, which make procedure calls (to offload computation), such as via Application Program Interface (API) calls, to the memory system controller 108 which communicates the procedure calls to the memory system 120. The memory processing controller 106 may uses memory-mapped I/O to communicate with the host processing cores 104 and receive messages (which may be 64-bits in size). The memory processing controller 106 converts such messages to fully formatted standard memory system messages (with custom message ID's) which are sent to the memory system controller 108 for transmission.

The memory processing controller 106 may include an SRAM buffer 110 that serves as a mailbox addressable by host processing cores 104, such as using memory-mapped I/O. Procedure call commands are written to the SRAM buffer 110, such as via 64-bit uncacheable store, and results from the memory processing cores are similarly read from the SRAM buffer 110. A single memory processing controller 106 may serve all host processing cores 104 of the host processor 102, and consequently, context status registers 112 are provided. In an embodiment, a single context could provide, for example, queuing 512 procedure call commands in flight, and providing 16 contexts could support a host processor execute 16 threads concurrently providing a (512*16*8) 64 KB SRAM buffer. In turn, a packet generator 114 converts and formats procedure call commands, via send buffer 116, for sending to the memory system controller 108, and procedure call results, via receive buffer 118, for receiving from the memory system controller 108. The memory system controller 108, in turn, communicates with the memory system 120.

Referring next to the memory system 120, formatted procedure call commands and results may be first handled by a SERDES (Serializer/Deserializer) 122, followed by an interconnection network 124 to a plurality of logic sections 126 (eight shown) implemented in a logic layer 128. Similar to the embodiment described above with respect to FIG. 1, the logic layer 128 may be stacked among a plurality of connected memory layers divided into memory sections 130 (eight shown) to form a memory column 129, with the logic section 126 connected to the memory column 129 to form a memory vault. Alternatively, similar to the embodiment described above with respect to FIG. 2, the logic layer 128 could be connected alongside the plurality of memory layers divided into the memory sections 130, such as via an interposer.

Consequently, the memory system 120 provides eight distinct memory vaults with extremely close and wide data paths. In addition, each memory section 130 may include two DRAM banks 132, providing a total of 256 DRAM banks in the memory system 120.

Each logic section 126 may include an individual vault controller 140 in communication with the interconnection network 124. The vault controller 140, in turn, may communicate with a compute the comprising a buffer 142 to a compute scheduler 144, and a bank scheduler 146 to a context registers 148. The bank scheduler 146 and the context registers 148, in turn, communicate with ordering logic 150 and with a compute fabric 152 comprising an array of memory processing cores 154 (eight shown). With eight logic sections 126, the memory system 120 may include sixty-four memory processing cores 154 (which may run sixty-four different programs concurrently), and with sixteen logic sections 126, the memory system 120 may include one hundred and twenty-eight memory processing cores 154 (which may run one hundred and twenty-eight different programs concurrently), scaling accordingly. The memory processing cores 154 could also implement increased fault tolerance by executing in lock-step redundancy, such as in pairs (or more) executing identical partitions within or between memory vaults.

The compute scheduler 144 receives procedure call commands and assigns procedure calls to next available memory processing cores 154. The compute scheduler 144 dequeus requests in-order, tracks the availability of the memory processing cores 154, and schedules requests to available the cores. The process of "assigning" a request entails delivering input arguments for the request (parameters for the function/kernel code) to the compute fabric 152 and the specific memory processing core 154. Once assigned, the core executes the kernel code and on-termination (indicated by asserting an IRQ line) notifies its completion status to the compute scheduler. Return values are delivered back to the memory processing controller 106 by the compute fabric 152 by generating response packets that are delivered by the vault controller 140.

The compute fabric 152 comprises the memory processing cores 154 and an 8-entry store buffer for each core (maintained outside the cores). Embodiments may provide enough compute capability to sustain accesses to 8 banks and perform computation. As described above with respect to FIG. 1, the memory processing cores 154 may be Cortex-M3 cores with short pipelines (three stages) and may contain private small (16 KB) Level-1 Data and Instruction SRAM memories for maintaining stack values and the program respectively. The memory processing cores 154 also each contain a 16-byte data register for sized to match the minimum size of the reads returned by the memory sections. With a plurality of lower clock speed and efficiently run memory processing cores close to memory, increased performance may be realized without relying on tiered caches and/or speculative execution.

The memory processing cores 154 access memory through the bank scheduler 146 which keeps track of the status of all banks in the memory vault and schedules accesses to these banks while adhering to DRAM or other memory timing requirements. Accordingly, the memory processing cores 154 execute instructions with information stored in their respective memory vault, interfacing to the memory sections 130 and the DRAM banks 132 via the bank scheduler 146.

The ordering logic 150 observes all memory requests in the memory vault and ensures sequential semantics. The ordering logic 150 ensures that stores from a "later" memory processing core 154, if they issue before loads from an "earlier" memory processing core 154 and are to the same address, are "squashed." Accordingly, the ordering logic 150 the memory vault is configured to store data processed by a first memory processing core responding to an earlier procedure call before storing data processed by a second memory processing core responding to a later procedure call. Approximate storage and hash functions to perform approximate matches with false positives are provided.

The ordering logic 150 maintains a per-bank read and write signature sets for each memory processing core 154 (total of 64 separate signatures). It is 8-way partitioned for the 8 memory processing cores 154, and each of the partitions has a write set and a read set to detect ordering conflicts. On every load and store the following conditions are checked: 1.) stores issued from head core search for matching load in later cores and squash (case SL); 2.) stores issued from head core search for matching store in later cores and squash (case SS): and 3). loads issued from non-head cores search for matching stores in earlier cores and squash self (case LS).

The write set consists of a bank steering logic 156, followed by hash units 158 (eight), followed by signature bits 160 (eight) for each bank, and followed by a mask concatenate logic 162. When a store from a memory processing core 154 reaches the ordering logic, it checks loads and stores of other memory processing cores 154 (forwarded to corresponding address bank by the bank steeling logic 156) with the hash units 158. The hash units 158 output the hash results and create the per-bank signature bits 160, which then form "SL" and "SS" mask bits. These per-bank SL and SS mask bits are concatenated and collected by the age-based mask concatenate logic 162. The mask concatenate logic 162 keeps track of the memory processing cores 154 in a logical circular buffer to determine the temporal ordering of cores in terms of requests, and creates a final flush mask to flush all memory processing core 154 requests in later temporal order. A read set follows the same process except it checks preceding stores. A squash implementation may operate to discard store buffer entries and restart requests.

Figure 5:
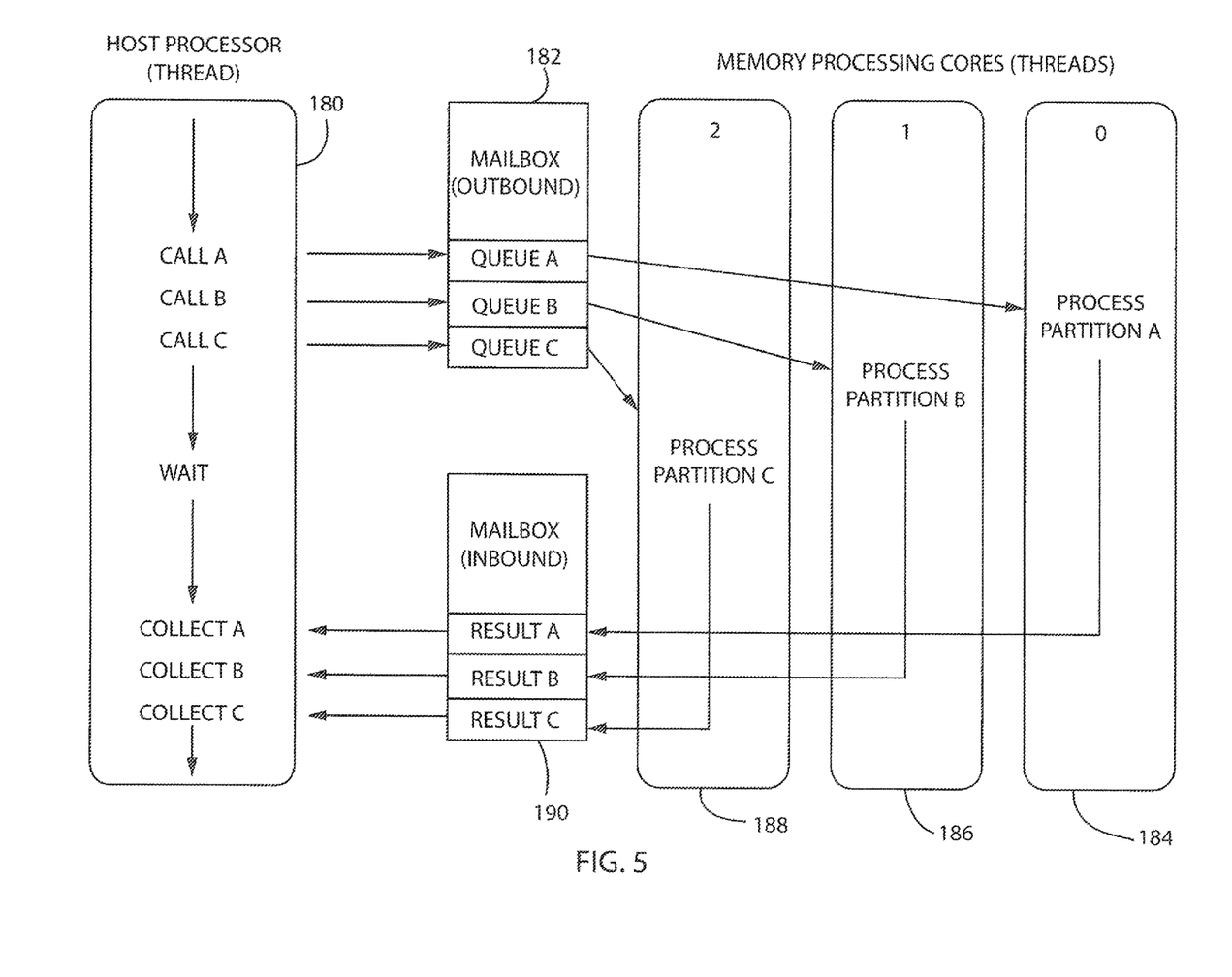
FIG. 5 is an exemplar depiction of execution flow for partitioned application code in accordance with an embodiment of the invention.

Referring now to FIG. 5, an exemplar depiction of execution flow for partitioned application code is provided in accordance with an embodiment of the invention. Here, remote memory procedure calls are used to offload computations of a particular granularity to memory. Memory processing cores perform the computations on behalf of a host processor making the memory procedure calls. These computations or "kernels" typically entail executing a memory intensive aspect of a workload being executed with a remaining aspect being executed on the host processor.

A kernel may perform arbitrary computations, and any sequence of memory accesses. The host processor may interfaces to the memory processing cores via a queue abstraction. Memory procedure calls may be queued for processing by memory processing cores with results subsequently provided.

For example, a core of a host processor may execute a host core thread 180 representing an application code divided into Partitions A, B and C, among others. Instructions and/or data for the Partitions A, B and C may be stored in Memory Vaults 0, 1 and 2, respectively. As the host processor executes the host core thread 180, the host processor makes memory procedure calls with respect to Partitions A, B and C, such as by queuing such partitions in a temporary memory buffer or mailbox (outbound) 182 allocated at run time.

Next, and in some embodiments with assistance of a memory processing controller, the Partitions A, B and C are dispatched to the appropriate Memory Vaults 0, 1 and 2, for information retrieval and local processing, based on target addresses of the Partitions A, B and C. For example, a memory procedure call with respect to Partition A may contain a target address corresponding to Memory Vault 0. Accordingly, the memory procedure call for Partition A may be dispatched to Memory Vault 0 for retrieval of instructions and data from the Memory Vault 0 and for processing a Memory Vault 0 Thread 184 by a memory processing core in the Memory Vault 0. Partitions B and C may be similarly dispatched to Memory Vaults 1 and 2 for processing a Memory Vault 1 Thread 186 and a Memory Vault 2 Thread 188, respectively. While the memory vault threads are executing, the host processor may wait idly for results and/or execute other aspects of the application code which may be less memory intensive.

The memory processing unit architecture essentially provides an abstraction of multiple, independent address spaces for partitions as opposed to a flat memory space. Partitions are constrained to only access data within defined address spaces with different execution streams accessing different address spaces. Consequently, a partition represents the largest size for a monolithic data set. This allows efficient hardware design that reduces latency by bringing computation close to memory. Programming according to partitioning data layout is intuitive and does not significantly complicate application design.

A partition may be instantiated with a hash table of a desired size, and if a target size exceeds a partition, a program may instantiate multiple copies of the hash table mapped to different partitions and statically assign workloads among memory vaults based on the multiple partitions. Also, if a target size exceeds a partition, a memory vault could be configured to generate an out-of-vault exception whenever execution of a partition attempts to access memory outside of its current partition. This exception may be reflected to the host processor, which may issue a read for data on another partition to send back to the memory vault that generated the exception for resuming execution.

Finally, results from each memory vault thread may be returned to the host processor, such as by queuing the results from the partitions in another temporary memory buffer or mailbox (inbound) 190 also allocated at run time. For example, upon the Memory Vault 0 Thread 184 completing processing of the Partition A, the Memory Vault 0 may return a Result A to the host processor via the mailbox (inbound) 190. Similarly, the Memory Vaults 1 and 2 may also return Results B and C, respectively, to the host processor via the mailbox (inbound) 190, which results may be provided in or out of order. The host processor may then collect the results for further processing in the host core thread 180.

The mailbox (outbound) 182 and the mailbox (inbound) 190 may serve as the primary interface between the application running on the host processor and the memory processing cores. Outbound calls and inbound results may be communicated, for example, via API calls.

In some embodiments, procedure calls that are dispatched to memory vaults may be executed out of order. As such, memory vaults may be configured to enable execution (or processing) of a later procedure call by a first memory processing core before execution (or processing) of an earlier procedure call by a second memory processing core. Such execution may also include completion of the processing, out of order, such that procedures are allowed to finish with their states stored, such as in a store buffer. Memory vaults may also re-execute (or re-process) these logically later procedure calls as necessary, such as if during execution of another thread it is determined that an address is accessed where a logically "earlier" procedure call (or thread) that executed later in time was stored.

It is specifically intended that the present invention not be limited to the embodiments and illustrations contained herein, but include modified forms of those embodiments including portions of the embodiments and combinations of elements of different embodiments as come within the scope of the following claims.

Certain terminology is used herein for purposes of reference only, and thus is not intended to be limiting. For example, terms such as "upper," "lower," "above," and "below" refer to directions in the drawings to which reference is made. Terms such as "vertical," "vertically," "horizontal," "horizontally," "column(s)," "row(s)," "front," "back," "rear," "bottom," "side," "left" and "right" describe orientations within a consistent but arbitrary frame of reference which is made clear by reference to the text and the associated drawings describing the component or system under discussion. For example, a vertically stacked memory configuration having memory columns could alternatively be viewed as a horizontally stacked memory configuration having memory rows. Also, such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

We claim:

1. A memory system for a host processor executing an application program, the memory system comprising:
 a plurality of physically continuous memory layers, each memory layer providing for data storage and divided into memory sections, wherein memory sections of each layer are vertically, electrically connected to other memory sections in other memory layers in a physical stack to form a plurality of separate memory columns communicating through the memory column; and
 a logic layer divided into logic sections, each logic section including at least one memory processing core, the memory processing core providing for fetch, decode, and execute cycles during which instructions are fetched and executed, wherein each logic section connects to a corresponding memory column to form a memory vault of connected logic and memory sections operable in parallel, and wherein each logic section further includes communication logic configured to communicate directly or indirectly with the host processor;
 wherein each memory processing core is configured to respond to a procedure call from the host processor designating a set of application code instructions and a target address of a given memory by:
 (a) receiving the set of instructions of the application program being executed by the host processor at the given memory vault, wherein the set of instructions is configured to be executed by a memory processing core of the given memory vault using data from the memory column of the data vault as a procedure call;
 (b) retrieving data stored in a memory column connected to a logic section including the memory processing core;
 (c) executing the set of instructions designated by the procedure call with the data to produce a result; and
 (d) providing the result back to the host processor in response to the procedure call.

2. The memory system of claim 1, wherein each logic section provides for multiple independent memory processing cores each providing for fetch, decode, and execute cycles during which instructions are fetched and executed, wherein each memory processing core is configured to respond to different procedure calls from the host processor, and
 wherein the host processor executes the application code divided into a plurality of partitions, and each partition is allocated for storage in a memory vault.

3. The memory system of claim 1, wherein each logic section includes at least one memory processing core per memory layer.

4. The memory system of claim 1, further comprising a compute scheduler in each logic section, wherein the compute scheduler assigns the procedure call to a next available memory processing core.

5. The memory system of claim 1, wherein each memory section comprises a plurality of DRAM memory banks.

6. The memory system of claim 5, wherein each logic section includes at least one memory processing core per DRAM memory bank.

7. The memory system of claim 1, wherein clock frequencies of the memory processing cores are less than a clock frequency of the host processor.

8. The memory system of claim 1, further comprising at least first and second memory processing cores associated with each memory vault, wherein the memory system is configured to enable execution of a later procedure call by a first memory processing core before execution of an earlier procedure call by a second memory processing core.

9. The memory system of claim 1, wherein the logic layer is stacked among the plurality of memory layers, and wherein the memory vaults are connected by through-silicon vias.

10. A computer system comprising:
 a host processor comprising at least one host processing core and a memory processing controller and adapted to execute an application program of instructions;
 a plurality of physically continuous memory layers, each memory layer providing for data storage and divided into memory sections, wherein memory sections of each layer are vertically, electrically connected to other memory sections in other memory layers in a physical stack to form a plurality of separate memory columns communicating through the memory column; and
 a logic layer divided into logic sections, each logic section including at least one memory processing core, the memory processing core providing for fetch, decode, and execute cycles during which instructions are fetched and executed, wherein each logic section connects to a corresponding memory column to form an addressable memory vault of connected logic and memory sections operable in parallel, and wherein each logic section further includes communication logic in communication with the host processor through the memory processing controller;
 wherein the host processor communicates procedure calls, designating sets of application code instructions and a target address of a given memory vault, to the memory processing controller, and the memory processing controller routes the procedure calls directly or indirectly to memory processing cores based on the target addresses of the procedure calls corresponding to memory vaults of the memory processing cores; and
 wherein the memory processing cores respond to the procedure calls by:
 (a) receiving the sets of instructions of the application program being executed by the host processor, wherein the set of instructions are configured to be executed by a memory processing core of a memory vault of a target address using data from the memory column of the data vault as a procedure call;
(b) retrieving data stored in memory columns connected directly without intervening cache structures to logic sections including the memory processing cores;
(c) executing the sets of instructions designated by the procedure call with the data to produce results; and
(d) providing the results back to the host processor in response to the procedure calls.

11. The computer system of claim 10, wherein the host processor executes the application code divided into partitions, wherein each partition is allocated for storage in a memory vault and the procedure call refers to the first and second partition.

12. The computer system of claim 10, wherein each logic section includes at least one memory processing core per memory layer.

13. The computer system of claim 12, further comprising a compute scheduler in each logic section, wherein the compute scheduler assigns procedure calls to next available memory processing cores.

14. The computer system of claim 10, wherein each memory section comprises a plurality of DRAM memory banks.

15. The computer system of claim 14, wherein each logic section includes at least one memory processing core per DRAM memory bank.

16. The computer system of claim 10, wherein clock frequencies of the memory processing cores are less than a clock frequency of the host processor.

17. The computer system of claim 10, further comprising at least first and second memory processing cores in a memory vault, wherein the memory vault is configured to enable execution of a later procedure call by a first memory processing core before execution of an earlier procedure call by a second memory processing core.

18. The computer system of claim 10, wherein the logic layer is stacked among the plurality of memory layers, and wherein the memory vaults are connected using through-silicon vias.

19. The computer system of claim 10, wherein the host processor queues a plurality of procedure calls in a single thread, and wherein a plurality of memory processing cores each execute a thread for responding to a procedure call.

20. A method for executing application code in a computer system comprising a host processor, a plurality of physically stacked memory layers, each memory layer providing for data storage and divided into memory sections, wherein memory sections of each layer are vertically, electrically connected to other memory sections in other memory layers to form a plurality of separate memory columns communicating through the memory column, and a logic layer divided into logic sections, each logic section including at least one memory processing core, the memory processing core providing for fetch, decode, and execute cycles during which instructions are fetched and executed, wherein each logic section connects to a corresponding memory column to form an addressable memory vault of connected logic and memory sections, wherein each logic section further includes communication logic configured to communicate directly or indirectly with the host processor, the method comprising:
(a) allocating partitions of the application code to memory vaults;
(b) communicating a procedure call designating a set of application code instructions executable by the host processor from the host processor to a memory processing core based on a target address of the procedure call corresponding to a memory vault of the memory processing core; and
(c) operating the memory processing core to respond to the procedure call by:
(i) receiving the set of instructions of the application program being executed by the host processor, wherein the set of instructions is configured to be executed by a memory processing core of a memory vault using data from the memory column of the data vault;
(ii) retrieving data stored in a memory column connected directly without intervening cache structures to a logic section including the memory processing core;
(iii) executing the set of instructions designated by the procedure call with the data to produce a result; and
(iv) providing the result back to the host processor in response to the procedure call.

21. The memory system of claim 1, wherein each memory processing core is further configured to respond by retrieving the set of instructions from the memory column connected to the logic section including the memory processing core.

22. The memory system of claim 1, further comprising a memory controller operable to route the procedure call to the memory processing core.

23. The memory system of claim 1 wherein the communication logic of each logic section configured to communicate directly or indirectly with the host processor includes a serializer/deserializer.

24. The memory system of claim 1 wherein each processing core includes a volatile random access memory for holding multiple instructions of the procedure call and provides an instruction set including: addition, multiplication, left shift, right shift, bitwise Boolean operations and conditional branch statements.

* * * * *